US007398114B2

(12) United States Patent  
Gartrell

(10) Patent No.: US 7,398,114 B2  
(45) Date of Patent: Jul. 8, 2008

(54) MOBILE STATION BODY COMPRISED OF STACKED ELEMENTS

(75) Inventor: Andrew Julian Gartrell, Tarzana, CA (US)

(73) Assignee: Nokia Corporation, Espoo (FI)

( * ) Notice: Subject to any disclaimer, the term of this patent is extended or adjusted under 35 U.S.C. 154(b) by 378 days.

(21) Appl. No.: 10/993,078

(22) Filed: Nov. 19, 2004

(65) Prior Publication Data

US 2006/0111052 A1 May 25, 2006

(51) Int. Cl.
 *H04M 1/00* (2006.01)
(52) U.S. Cl. .................. 455/575.8; 455/575.1; 361/814
(58) Field of Classification Search .............. 455/575.1, 455/575.3, 575.8, 550.1, 90.3; 369/679, 369/735; 361/679, 735, 814
 See application file for complete search history.

(56) References Cited

U.S. PATENT DOCUMENTS 4,293,754 A   10/1981  Komaki

| 5,371,790 | A | 12/1994 | Nevo et al. |
| 6,137,686 | A * | 10/2000 | Saye ........................... 361/732 |
| 6,477,357 | B1 | 11/2002 | Cook |
| 2004/0077388 | A1 | 4/2004 | Crum |
| 2004/0204203 | A1 * | 10/2004 | Lee .......................... 455/575.1 |

FOREIGN PATENT DOCUMENTS

| EP | 0909655 A2 | 4/1999 |
| EP | 1168394 A2 | 1/2002 |
| GB | 2 375 683 A | 11/2002 |
| WO | WO 03/054672 A1 | 7/2003 |

* cited by examiner

*Primary Examiner*—Lewis G West
(74) *Attorney, Agent, or Firm*—Alston & Bird LLP

(57) ABSTRACT

An improved body design for a mobile station or other electronic device is provided. Unlike conventional mobile station bodies, which are comprised of durable polymer shells that are rigidly joined together (e.g., by ultra-sonic welding, adhesives, etc.) to enclose operational elements and circuitry, a replaceable and enhanceable body structure comprised is provided that is comprised of one or more stacked elements. The stacked elements are positioned one atop the next in a facing relationship. In one embodiment, the stacked elements define one or more apertures for receiving and enclosing one or more operational elements (e.g. a display, a keypad, an antenna, a mobile station engine, etc.).

28 Claims, 15 Drawing Sheets

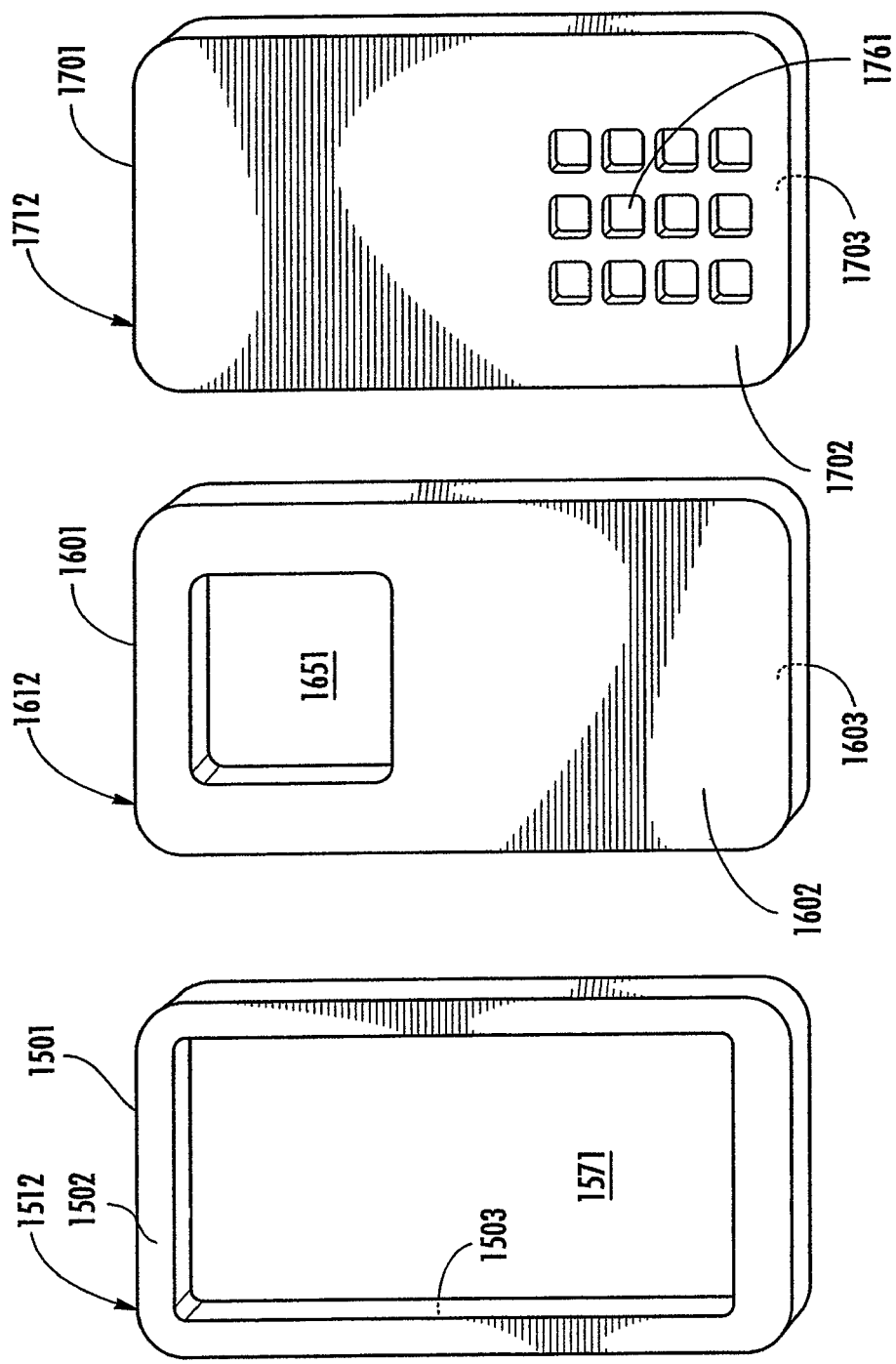

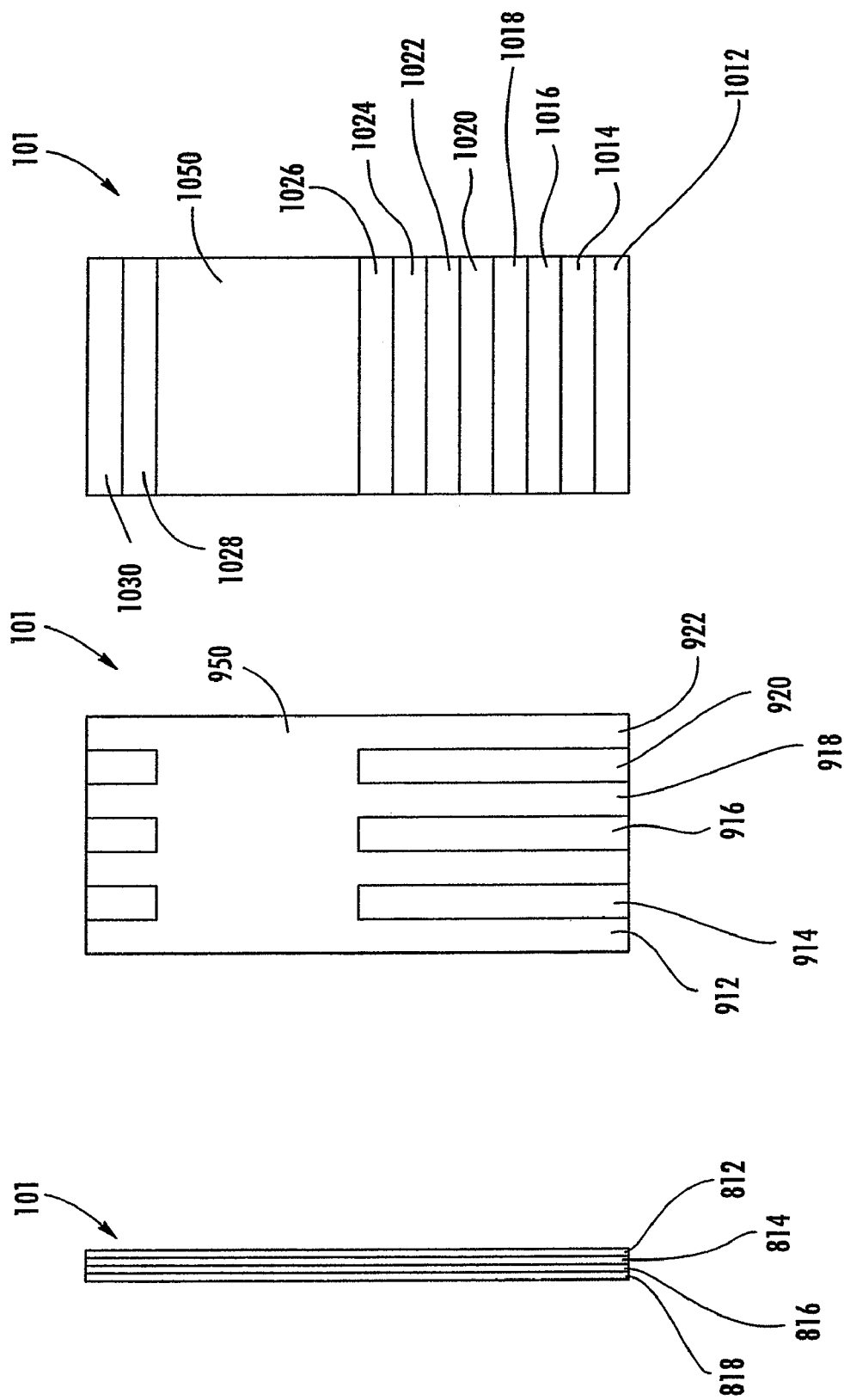

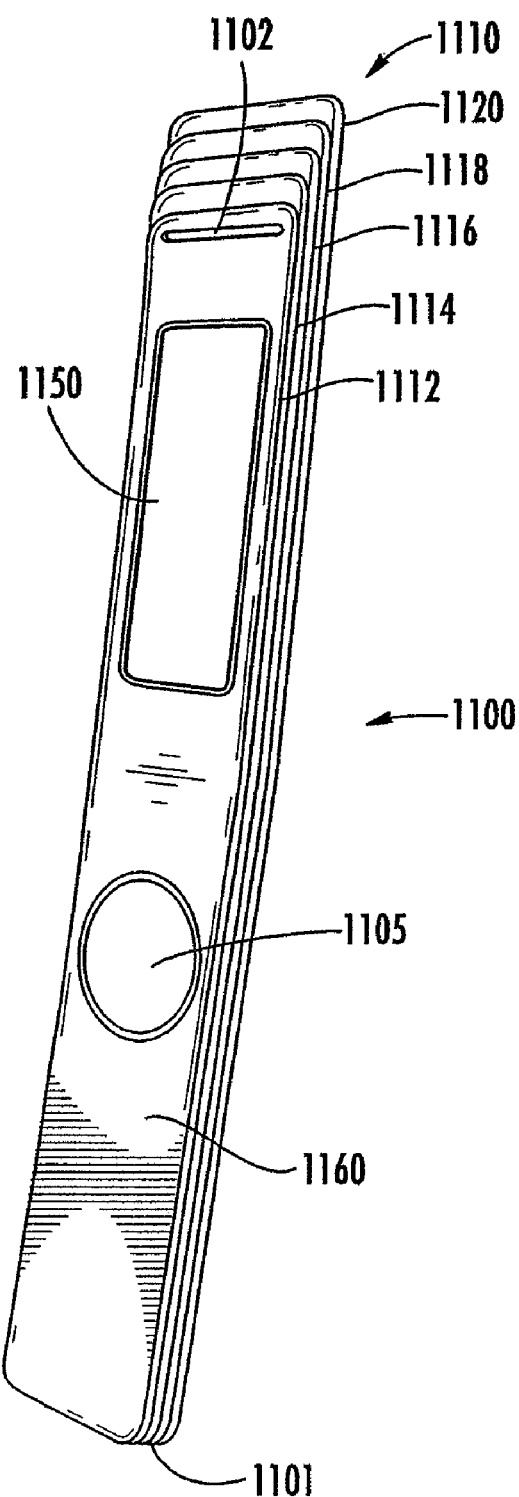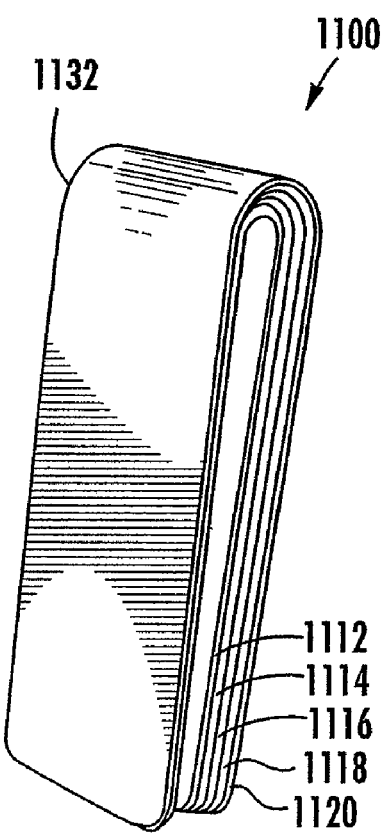
FIG. 12A
FIG. 12B

MOBILE STATION BODY COMPRISED OF STACKED ELEMENTS

BACKGROUND OF THE INVENTION

1. Field of the Invention

The invention relates generally to mobile station design, and more particularly to a mobile station having a body portion comprised of a plurality of stacked elements. Among other benefits, the plurality of stacked elements provide improved versatility, cost savings, and aesthetic appeal to the mobile station.

2. Description of Related Art

Mobile stations (e.g., mobile phones, PDAs, pagers, laptop computers and the like) have become ubiquitous over the last twenty years. Although mobile station designs have become smaller and more compact, the basic structure of these devices has generally remained constant. As shown in FIG. 1, conventional mobile stations 100 (a mobile phone) include a durable shell 110 enclosing various operational elements. Such operational elements include a display (LCD, LED or the like) 150, a speaker port 154, a microphone port 155, a keypad 160, and associated electronic circuitry (not shown). Mobile stations also include antennas (not shown) for facilitating radio frequency (RF) communications and one or more batteries (not shown). An external power supply (not shown) such as an AC adaptor, power cord, battery charger and the like, may be connected through a power port 144.

In various applications, the circuitry driving the above operational elements (display, keypad, mobile station engine, etc.) is protected from damage by a durable shell 110 as shown. Such durable shells 110 are often comprised of polymers, metals, pressed sheets, and other similar materials. To ensure that the delicate circuitry and other components remain protected, the two halves 112 and 114 of the shell 110 are generally hermetically sealed via various known processes including ultra-sonic welding, adhesive bonding, etc. Unfortunately, the protection afforded by using a hermetically sealed shell 110 comes at the expense of mobile station design versatility. For example, consumers do not conventionally have the ability to swap internal components or electronic circuitry for newer, smarter or more powerful versions (as is relatively common in the personal computing industry). Further, consumers are unable to change the size, shape, color or structure of the mobile station. For example, consumers are unable to change conventional "mono-block" style mobile phones shown in FIG. 1, into "foldable" mobile stations as known in the art. Presently, consumers desirous of this or other substantive mobile station enhancement must purchase a new mobile station, likely at significant cost.

BRIEF SUMMARY OF THE INVENTION

The present invention provides an improved body design for a mobile station or other electronic device. Unlike conventional mobile station bodies, which are comprised of an outer shell rigidly enclosed (e.g., by ultra-sonic welding, adhesives, proprietary screws, hidden plastic snaps, etc.) around operational elements and circuitry, the present invention provides a replaceable and enhanceable body structure comprised of a plurality of stacked elements. The stacked elements are positioned one atop the next in face-to-face alignment. In one embodiment, the stacked elements define one or more apertures for receiving and enclosing one or more operational elements (e.g. a display, a keypad, an antenna, a mobile station engine, etc.). In another embodiment, two or more of the stacked elements define commonly-aligned apertures for receiving and enclosing operational elements having thicknesses greater than a single stacked element layer. In other embodiments, the apertures may be off-set relative to one another to distribute the operational elements between stacked element layers. In still other embodiments, one or more stacked elements may include integral operational elements. Such operational elements may, in some cases, cause the stacked element to define raised protrusions that are received by apertures disposed in adjacent stacked elements.

In various embodiments, the stacked elements are sandwiched between first and second covers. The covers and stacked elements combine to define a mobile station body. In one embodiment, the covers are removable, thus, providing access for consumers to remove and replace one or more of the stacked elements. This configuration also provides consumers access to remove and replace one or more operational elements. Accordingly, unlike conventional mobile stations having limited enhanceability, consumers of mobile stations according to the present invention, may enhance the structure and function of their mobile station with newer, faster and otherwise more desirable operational elements. In other embodiments, the size, shape, thickness, number, color, material composition and orientation of one or more of the stacked elements may be altered either to suit a consumer's preferences or alternatively, to conform to the requirements of an operational element enhancement as described below.

In another embodiment, one or more of the stacked elements may include conductive regions for electrically connecting the one or more stacked elements. Accordingly, operational elements disposed adjacent one or more of the stacked elements may be placed in electronic communication via such conductive regions. In one embodiment, the conductive regions may be protected from external elements (moisture, etc.) by rubber seals provided about the perimeter of the stacked elements.

In another embodiment, the mobile station is a foldable mobile station having a first end, a second end, and a foldable region defined therebetween. In this embodiment, the stacked elements and removably attached covers, which combine to comprise the body of the mobile station, are configured to be flexible proximate the foldable region. Accordingly, mobile stations according to various embodiments can be moved between open and folded positions. In one embodiment, the first end of a mobile station is rigidly fixed together while the second end is not rigidly fixed. As a result, the stacked elements positioned adjacent the second end are allowed to unfurl as the mobile station is moved between the open and folded positions.

In another embodiment, the mobile station includes a unique flexible cover having a laser-cut and laser-etched keypad. In one embodiment, the cover is comprised of translucent polypropylene or other similar materials. Laser light is directed over the cover at a power level sufficient to cut a keypad pattern onto the cover. In particular, according to one embodiment, the laser is directed to cut discrete key-tabs into the surface of the cover. In another embodiment, the cover is at least partially comprised of one or more laser sensitive pigments. As a result, the key-tabs may be laser-etched with numbers, letters, characters, icons, or other similar indicia. Laser-etching entails providing laser light at an intensity lower than that required to cut the cover, such that the laser light only reacts with laser sensitive pigments within the cover, thus, forming the aforementioned indicia.

In another embodiment, the mobile station may be a flipable mobile station having a connector hub or clamp for attaching and electrically connecting the plurality of stacked elements. In one embodiment, the connector hub is positioned adjacent a first end such that the stacked elements provided adjacent the second end are held relatively loosely together, thus, allowing consumers to flip between stacked elements and access any operational elements disposed thereon.

These and other features, aspects, and advantages of embodiments of the present invention will become apparent with reference to the following description in conjunction with the accompanying drawings. It is to be understood however, that the drawings are designed solely for the purposes of illustration and not as a definition of the limits of the invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4A:
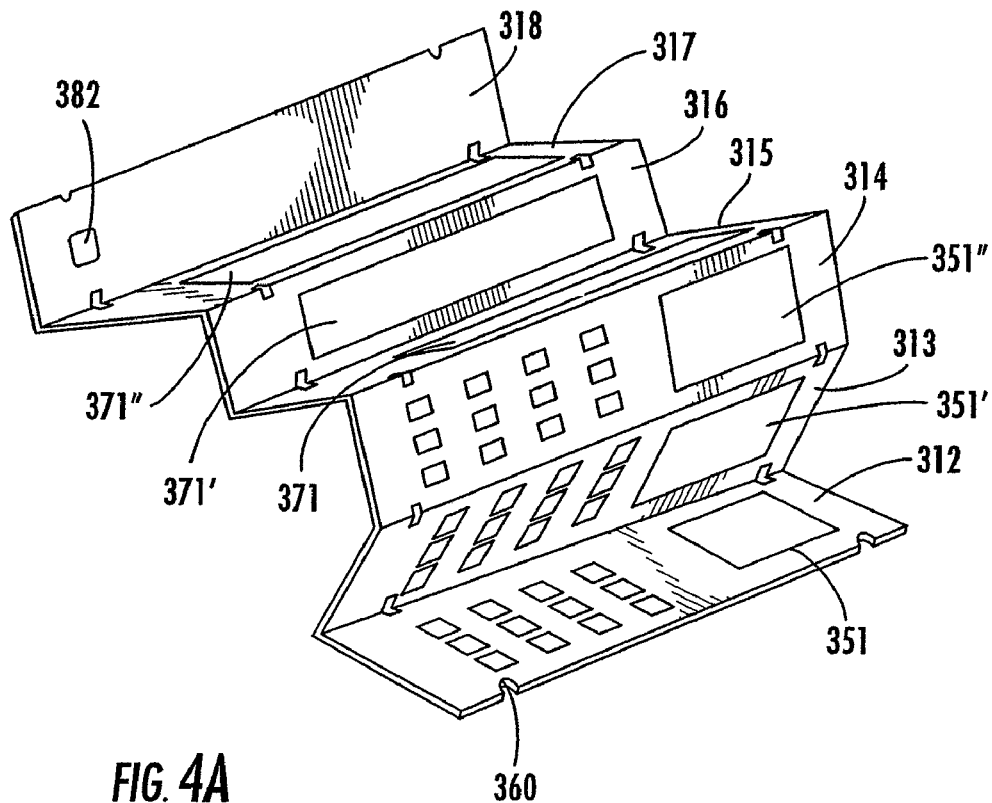
Figure 4B:
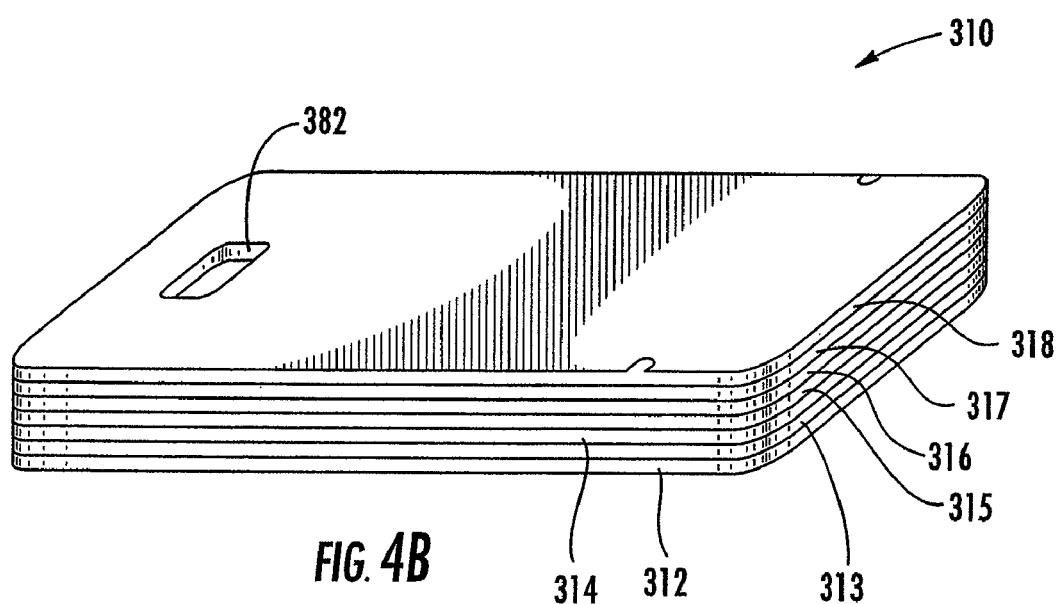
Figure 5:
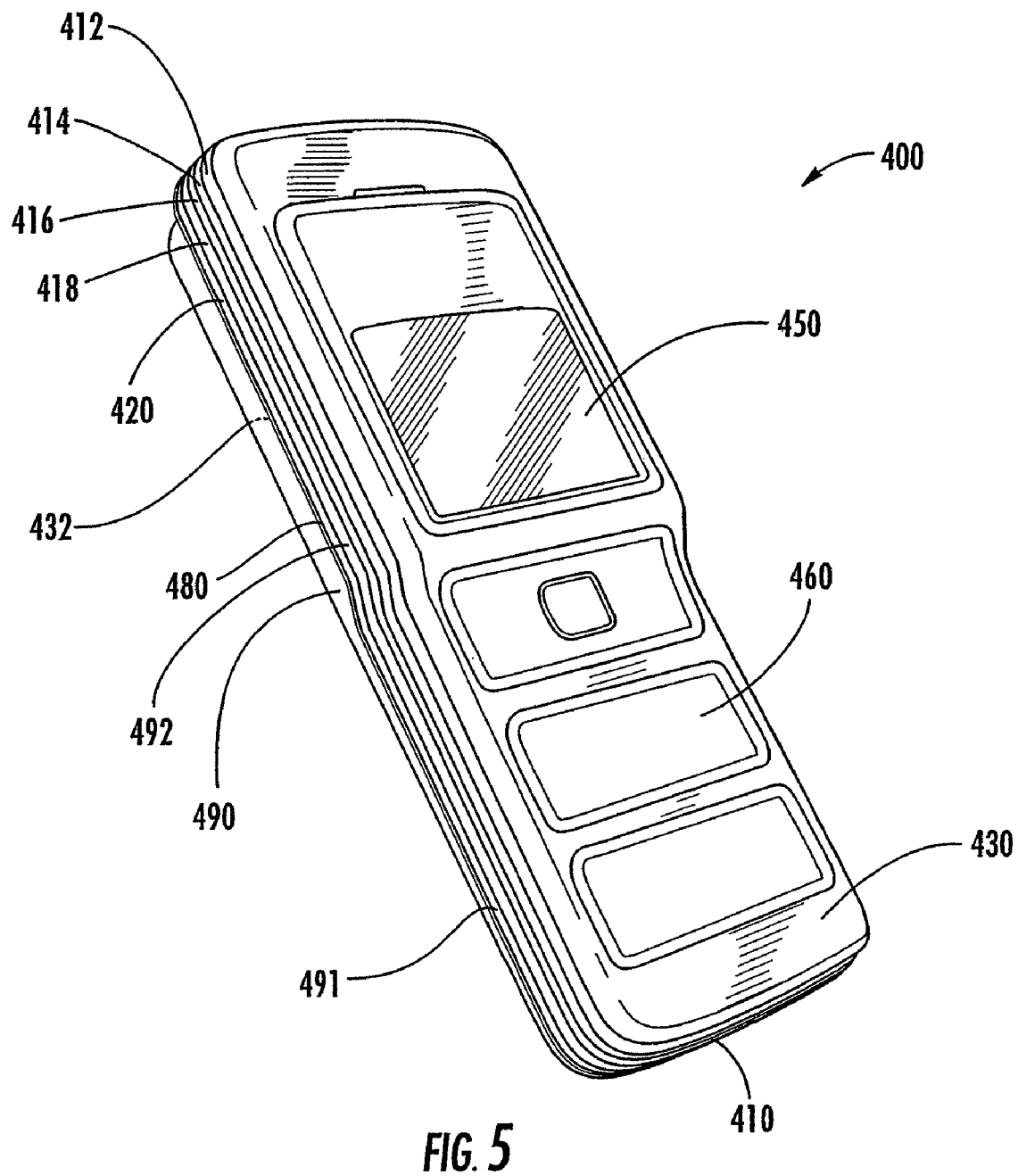
Figure 6:
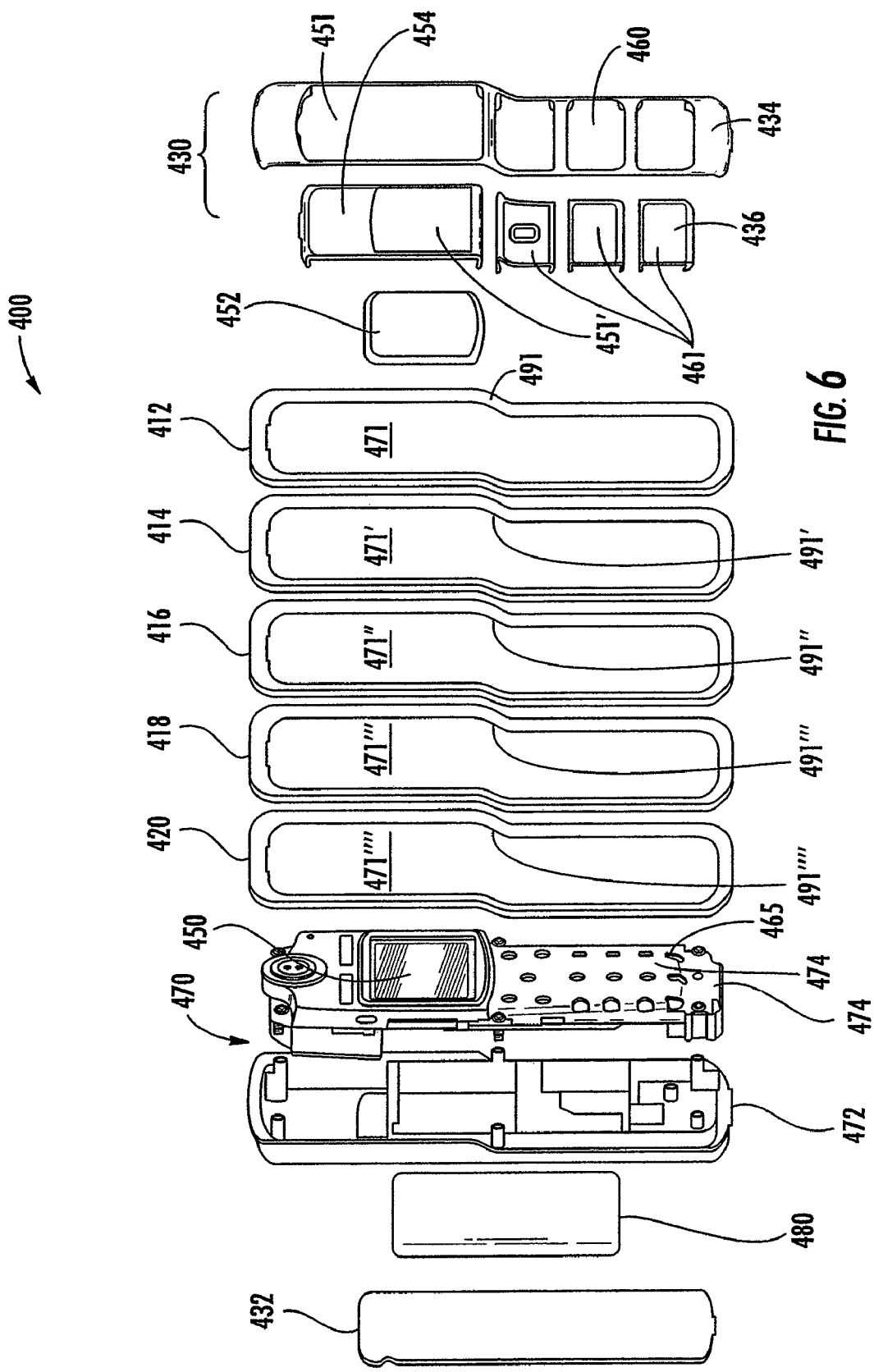
Figure 7B:
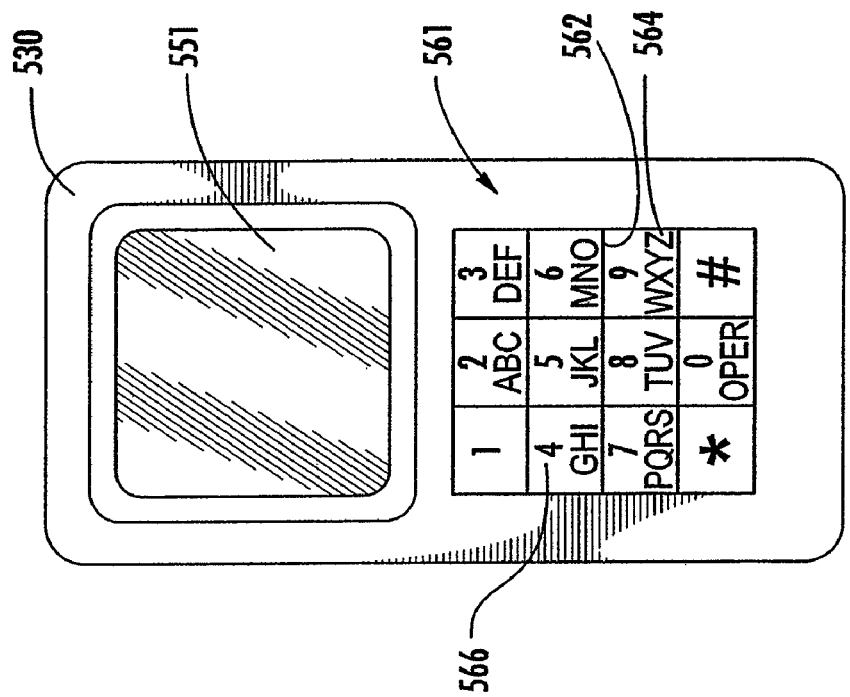
Figure 7A:
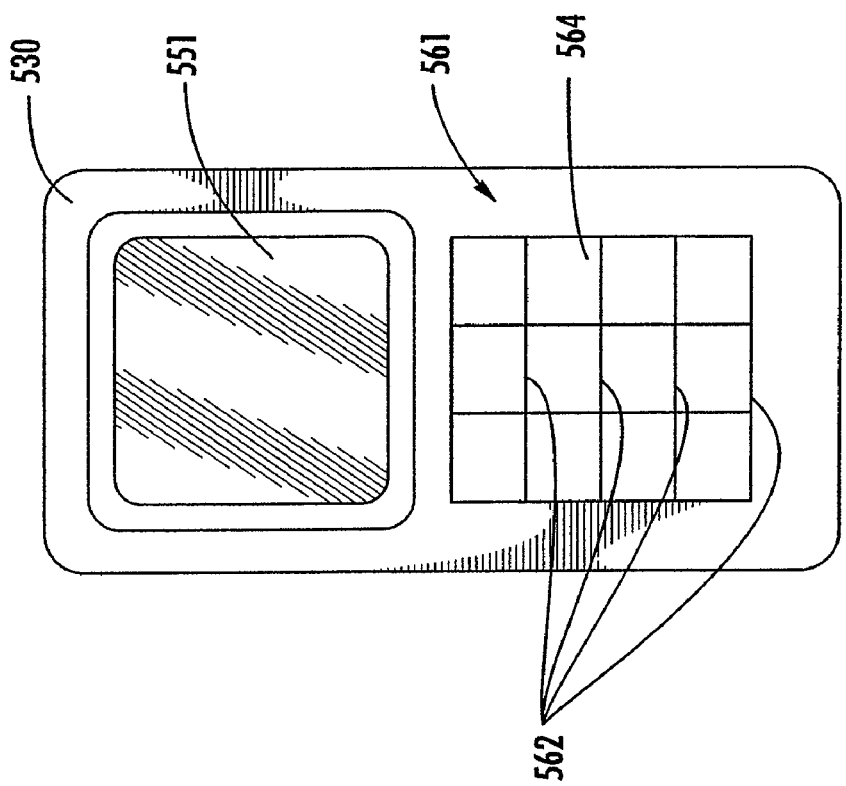
Figure 8:
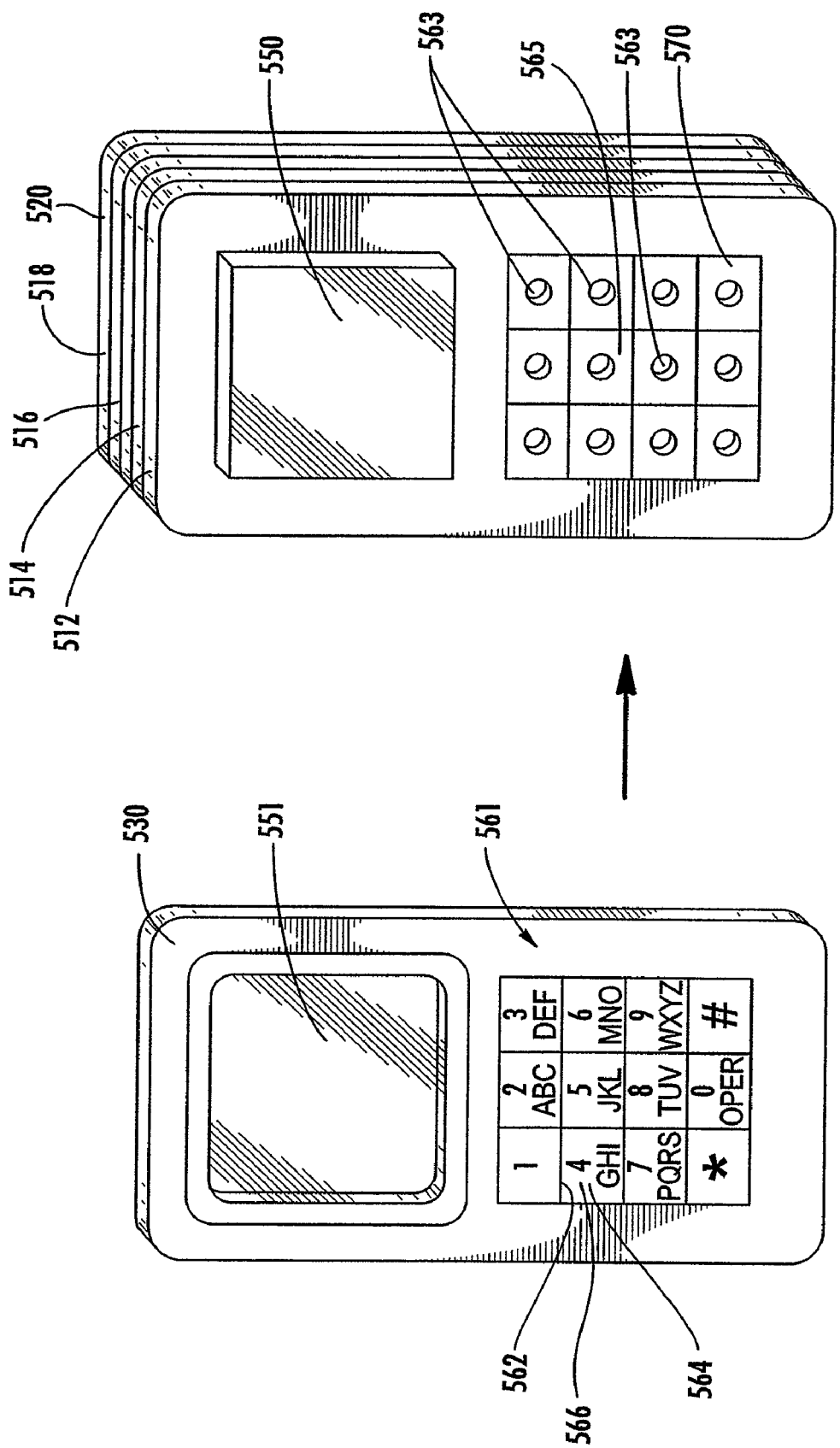
Figure 9:
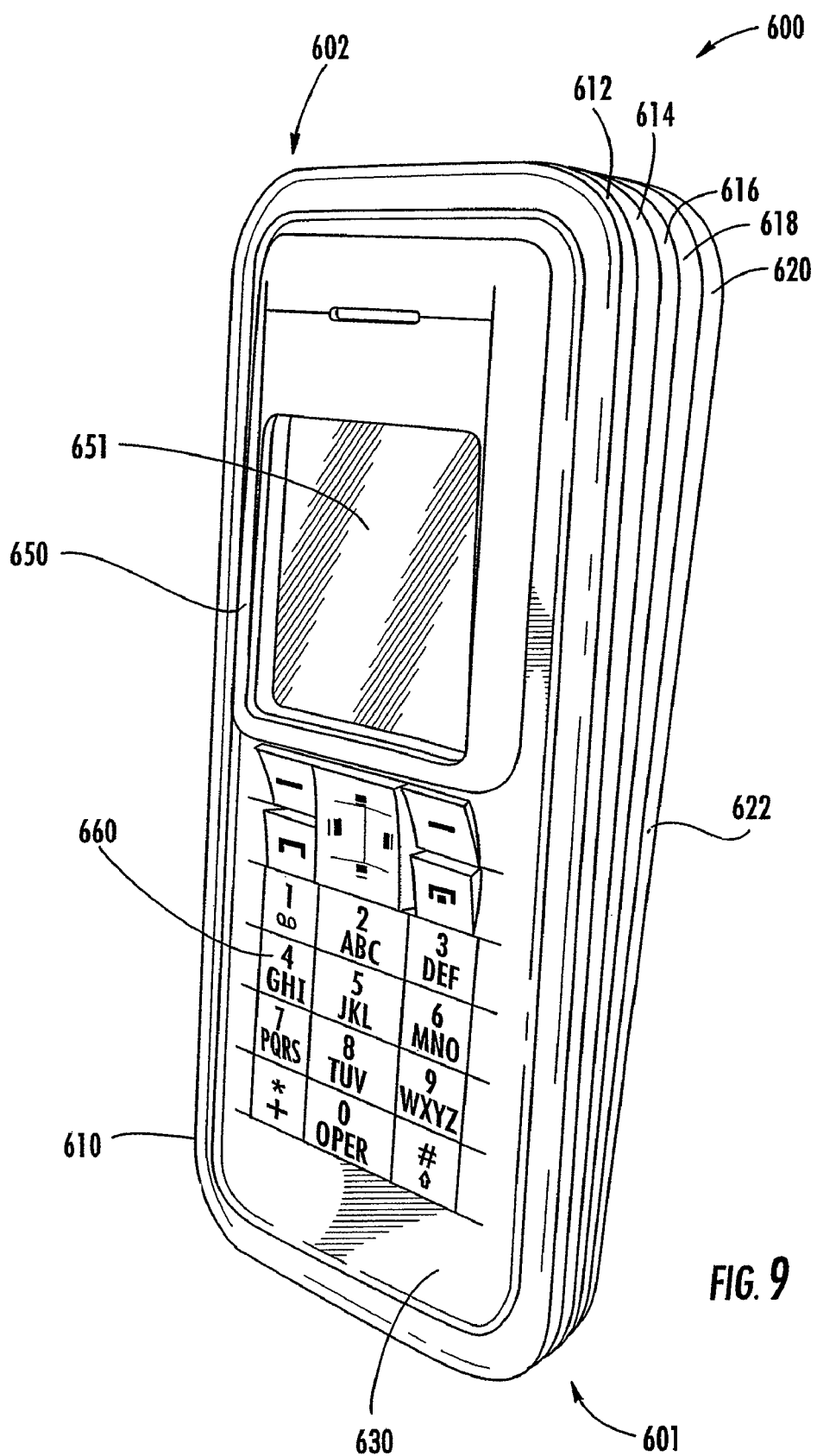
Figure 10:
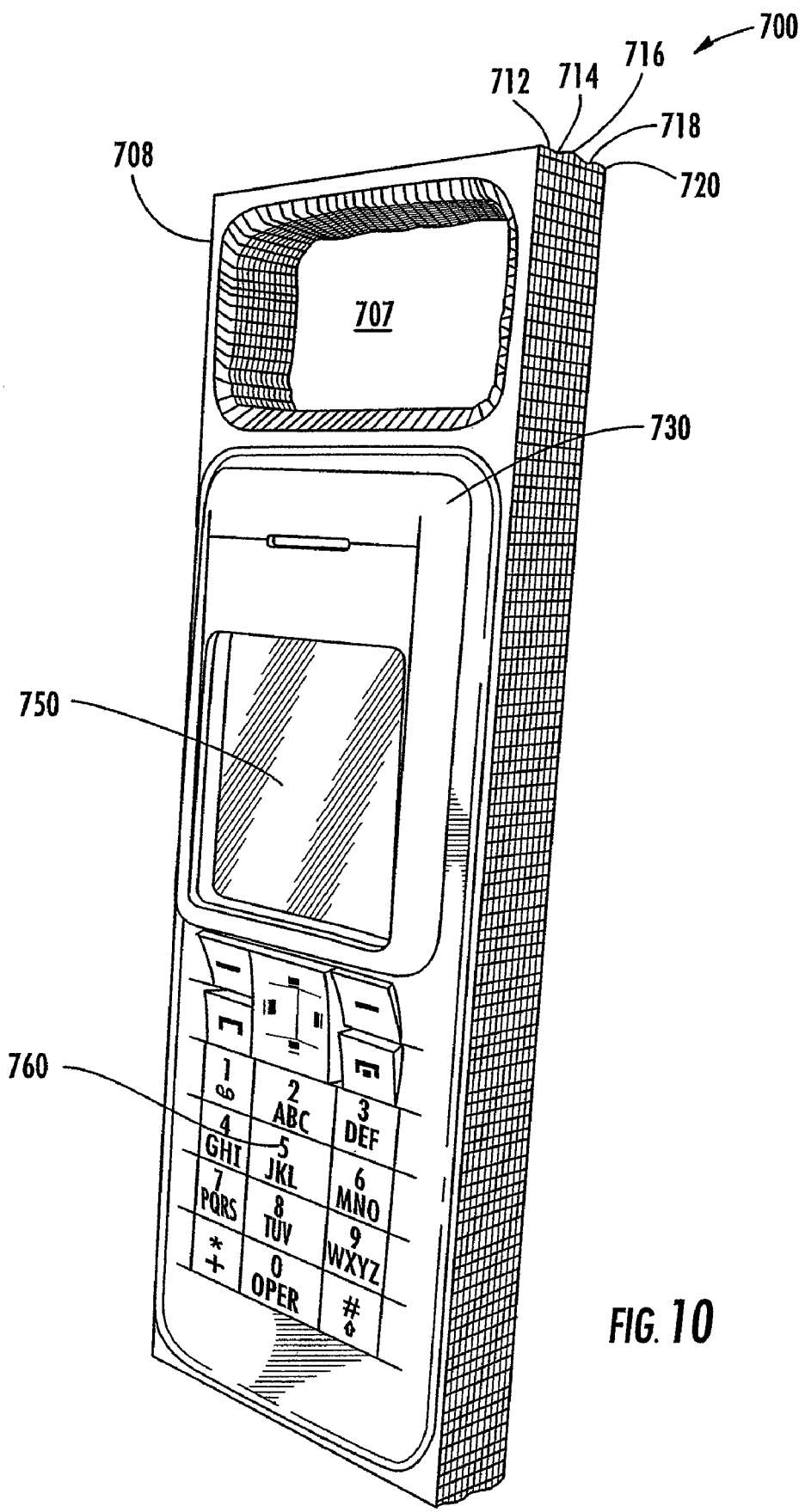
Figure 11D:
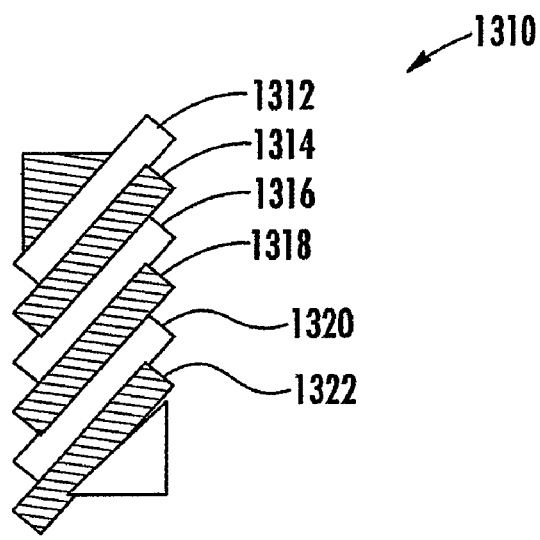
Figure 11E:
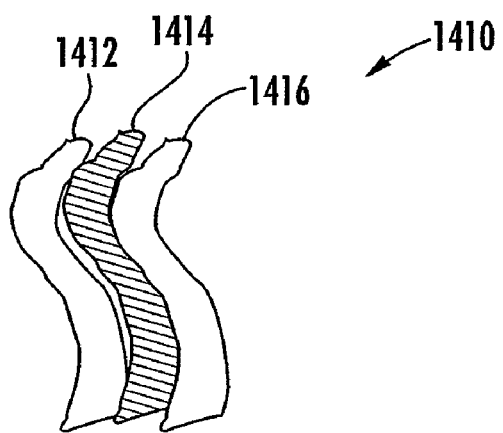
Figure 11F:
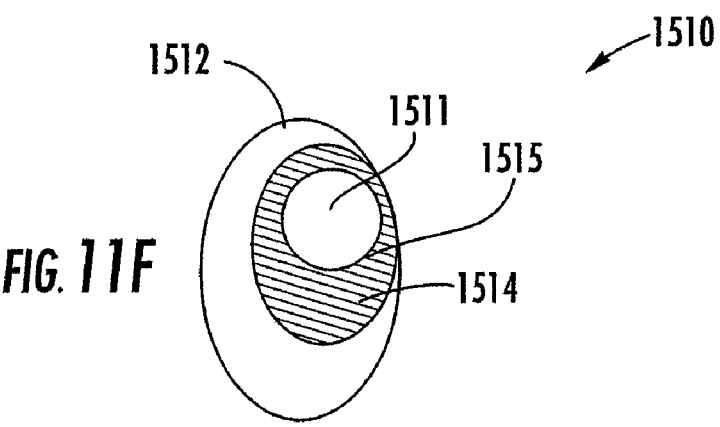
Figure 13:
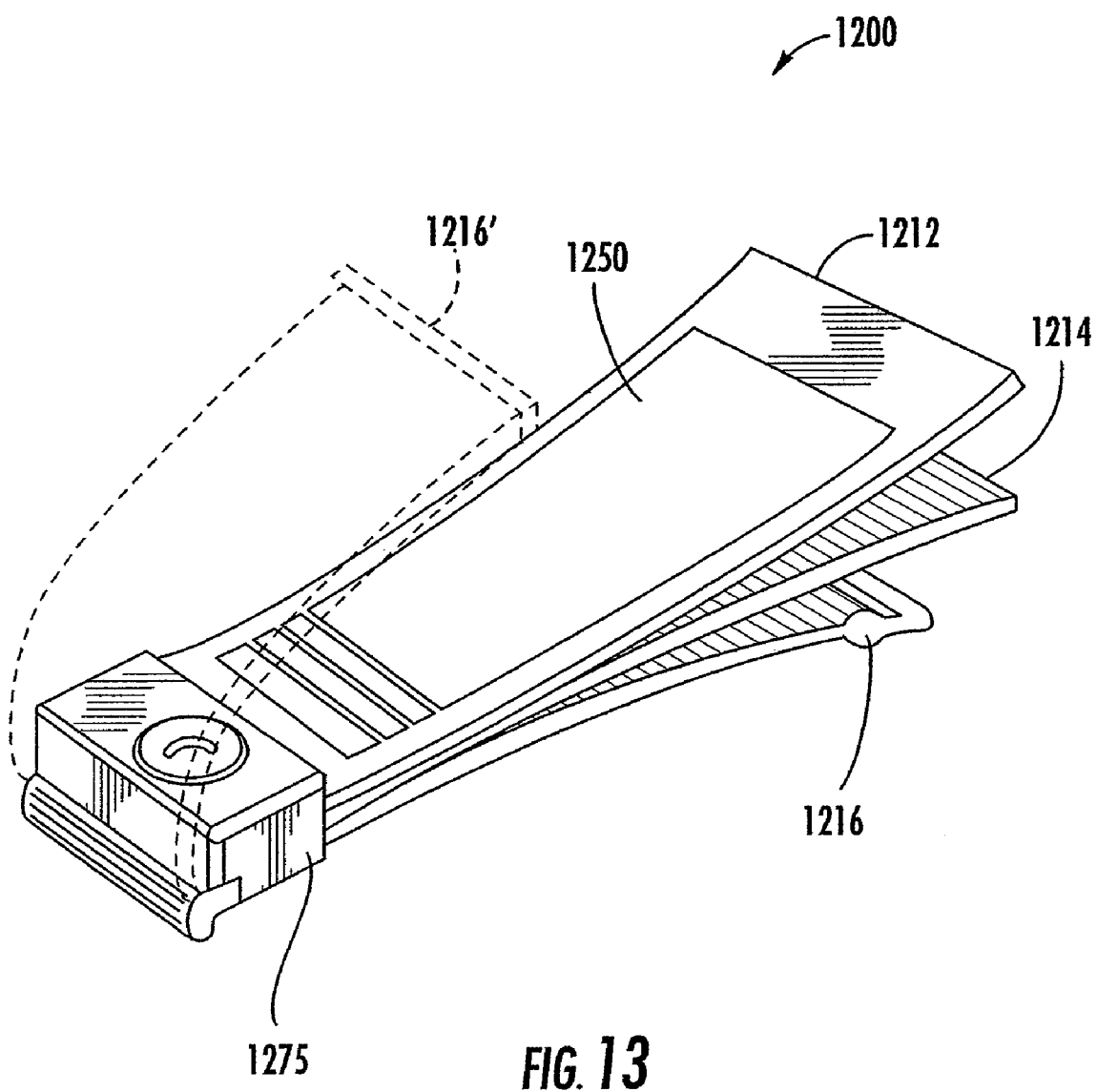

FIGS. 3B, 3C, and 3D are perspective views of various stacked element embodiments according to the invention; wherein FIG. 3B is a perspective view of a ring-shaped stacked element embodiment, FIG. 3C is a perspective view of a stacked element embodiment defining a display window, and FIG. 3D is a perspective view of a stacked element embodiment defining keypad apertures;

FIGS. 4A and 4B depict a mobile station body having folded stacked elements in accordance with one embodiment of the invention; wherein FIG. 4A is a perspective view of a plurality of stacked elements that are folded accordion-style and secured together to form the mobile station body portion depicted in FIG. 4B;

FIG. 5 is a perspective view of a mobile station having non-planar stacked elements in accordance with one embodiment of the invention;

FIG. 6 is an exploded view of the mobile station depicted in FIG. 5;

FIGS. 7A and 7B depict a mobile station keypad cover in various stages of formation according to various embodiments of the invention; wherein FIG. 7A illustrates a plurality of laser-cut key-tabs formed in the keypad cover, and FIG. 7B illustrates laser-etched indicia formed on one or more of the key-tabs;

FIG. 8 illustrates the assembly of a laser cut/etched cover and a mobile station engine in accordance with one embodiment of the invention;

FIG. 9 illustrates a mobile station having one or more non-uniform stacked elements in accordance with one embodiment of the present invention;

FIG. 10 illustrates a mobile station having stacked elements configured to define a wearable hanger in accordance with one embodiment of the present invention;

FIGS. 11A-11C depict stacked element orientations in accordance with various embodiments of the present invention; wherein FIG. 11A depicts a first axially-aligned stacked element configuration, FIG. 11B depicts a second axially-aligned stacked element configuration, FIG. 11C depicts a transversely-aligned stacked element configuration, FIG. 11D depicts a diagonally aligned stacked element configuration, FIG. 11E depicts a curved stacked element configuration, and FIG. 11F depicts a three-dimensional stacked element configuration;

FIGS. 12A and 12B depict open and folded mobile station configurations in accordance with another embodiment of the invention; and FIG. 13 illustrates a mobile station having a connection hub for securing one or more stacked elements in accordance with another embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
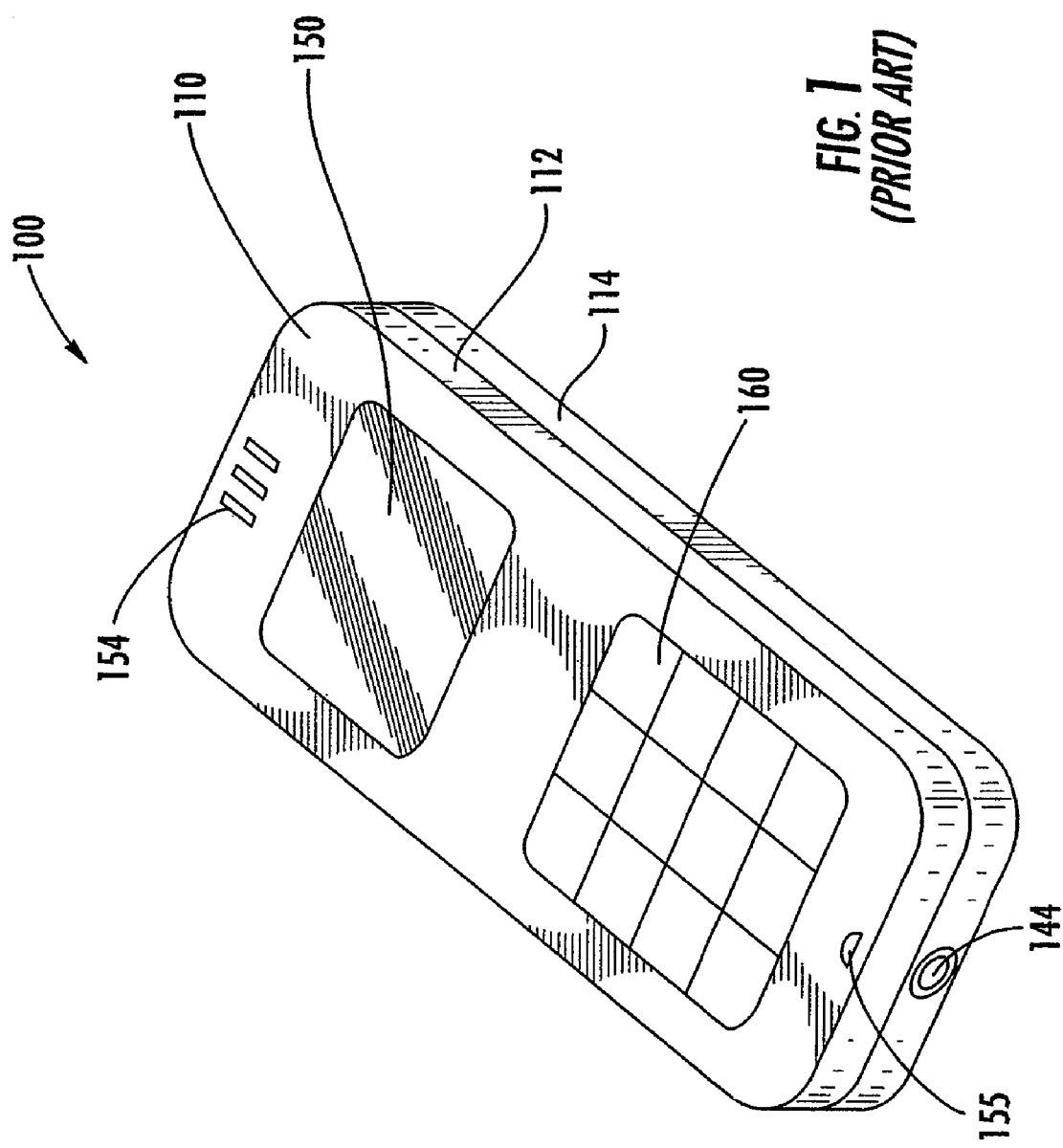
FIG. 1 is a perspective view of a mobile station according to the known prior art.
Figure 2:
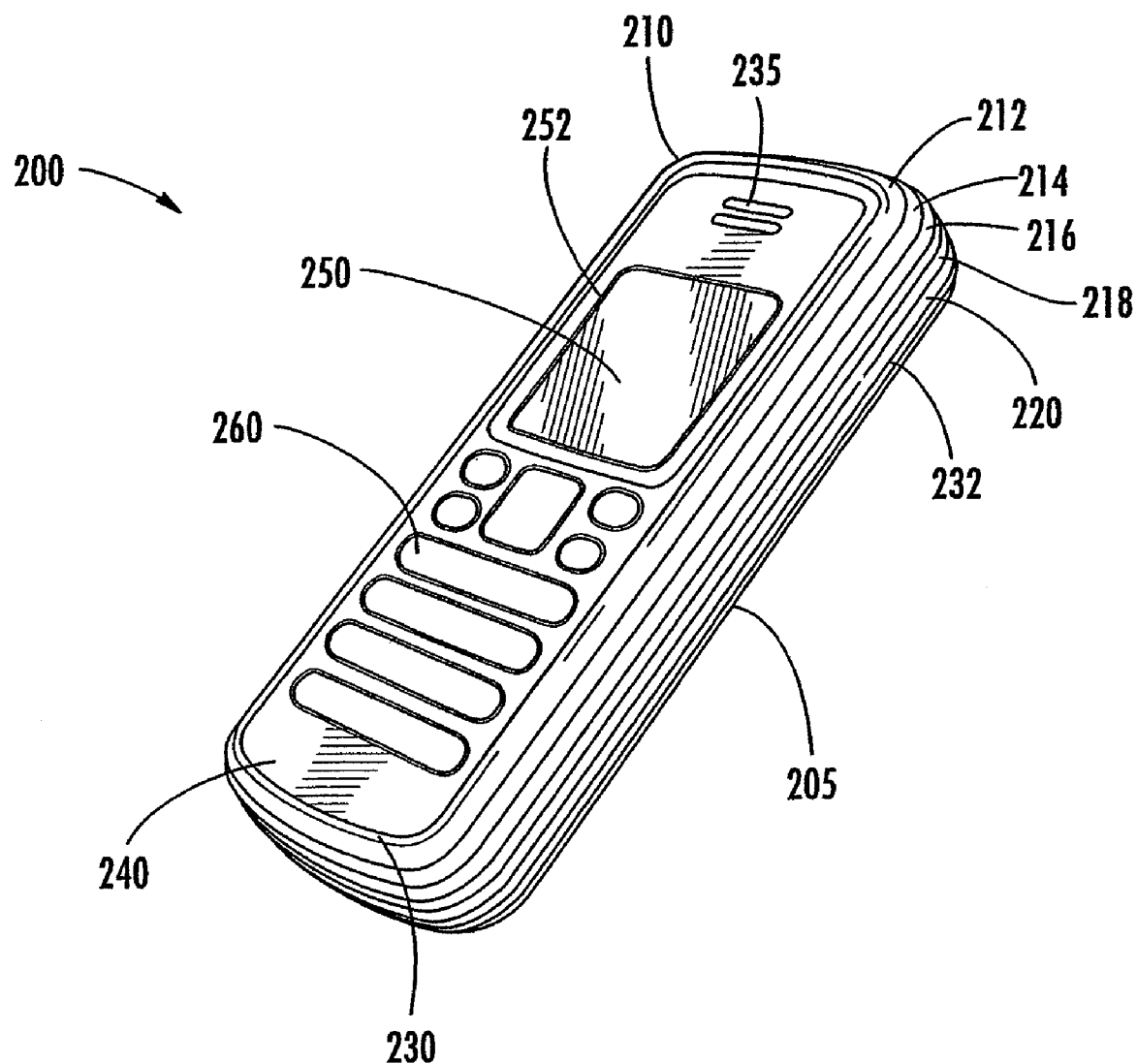
FIG. 2 is a perspective view of a mobile station having a body portion comprised of replaceable stacked elements in accordance with one embodiment of the invention.

Referring to FIG. 2, there is illustrated a mobile station 200, in accordance with one embodiment of the present invention. For the purposes of the following specification and appended claims, the term "mobile station" refers to mobile phones, PDAs, pagers, calculators, laptop computers, and other similar electronic devices as commonly known in the art. Although a simple "mono-block" style (i.e., non-folding, non-twisting, non-articulating, etc.) mobile phone has been depicted for illustration purposes, the inventive concepts described herein may be applied to several additional mobile station applications as will be apparent to one of ordinary skill in the art. The depicted mobile station 200 includes a body portion 210 for at least partially enclosing various operational elements including one or more displays 250, keypads 260, antennas (not shown), microphone ports 240, speaker ports 235, power cords ports (not shown), memory card ports (not shown) and the like. As known in the art, in various embodiments, the body portion 210 at least partially encloses electronic circuitry (not shown) for driving the above operational elements. Accordingly, the operational elements are protected from damaging impacts, weather, or other external forces. The mobile station body 210 also provides a means or structure by which users grasp, manipulate and operate the mobile station 200.

In various embodiments, the mobile station body 210 is comprised, at least partially, of a plurality of stacked elements 212, 214, 216, 218, 220. Although depicted as having five stacked elements 212, 214, 216, 218, 220, the present invention is not limited to such a configuration and may include more or fewer stacked elements as will be apparent in view of the disclosure provided below. In the depicted embodiment, the stacked elements 212, 214, 216, 218, 220 are sandwiched between first and second covers 230, 232. The number, shape and thickness of the stacked elements can vary between applications as described in detail below. In one embodiment, the first cover 230 is configured to support attached, embedded or integral displays 250, keypads 260, microphone ports 240, speaker ports 235 and the like. In other embodiments, these or various other operational elements (e.g., power cord port, headphones port, etc.) may be attached, embedded, or integral to the second cover 232. In various embodiments, the first and second covers 230, 232 are comprised of polymer materials, composite materials, rubber, metal, and other durable materials.

Figure 3A:
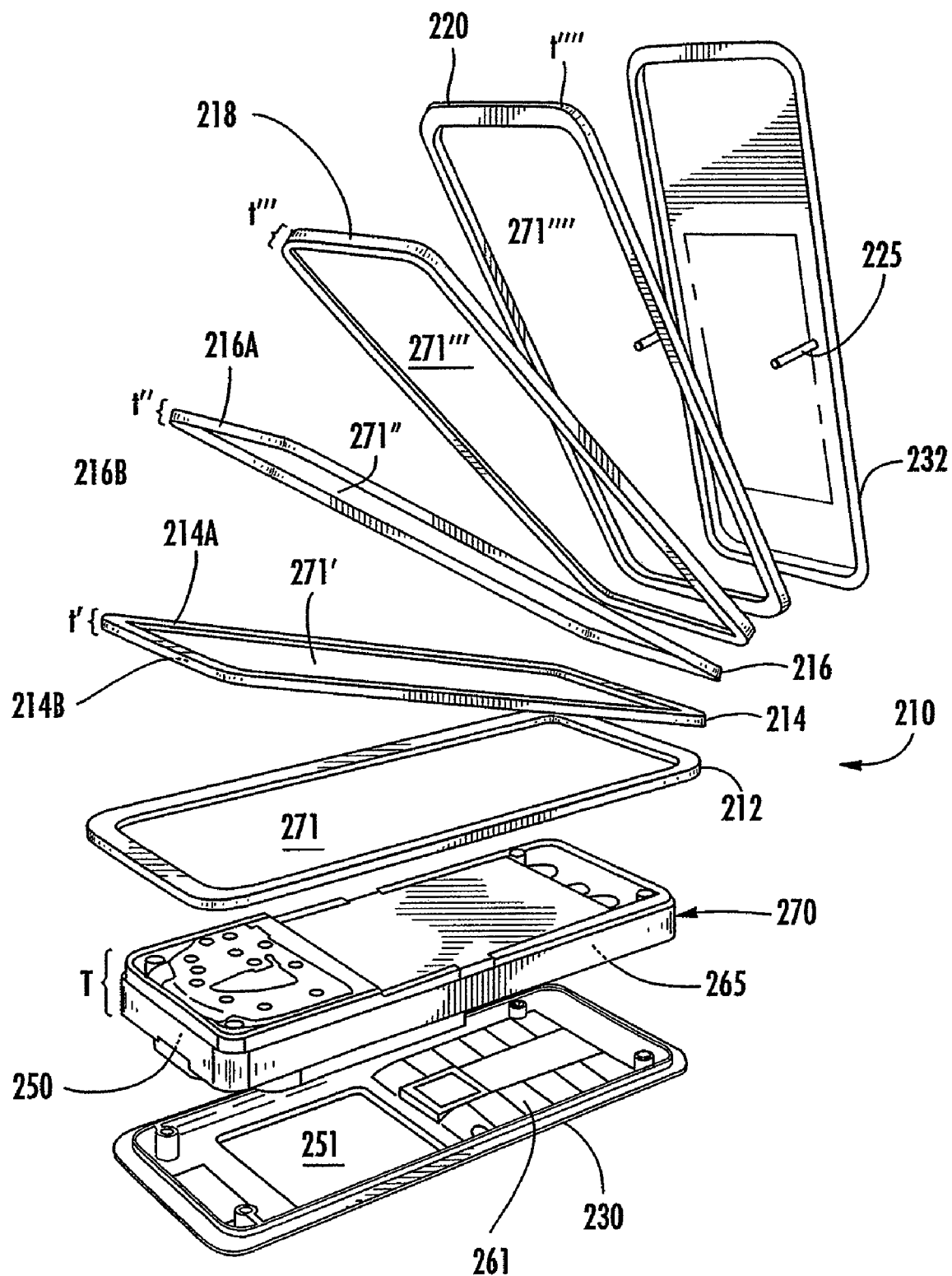
FIG. 3A is an exploded view of the mobile station depicted in FIG. 2.

FIG. 3A illustrates an exploded view of the mobile station 200 depicted in FIG. 2. More particularly, FIG. 3A depicts the stacked orientation of the plurality of stacked elements 212, 214, 216, 218, 220 in accordance with one embodiment of the invention. FIGS. 3B-3D illustrate individual stacked elements according to various embodiments of the invention. The stacked elements 1512, 1612, 1712 depicted in FIGS. 3B-3D define perimeter edges 1501, 1601, 1701 that bound first and second surfaces 1502, 1602, 1702 and 1503, 1603, 1703, respectively. Although the stacked elements depicted in FIGS. 3A-3D have generally planar first and second surfaces 1502, 1602, 1702 and 1503, 1603, 1703, this need not be the case, as several non-planar stacked element configurations are possible as described below.

In various embodiments, the stacked elements provide a framework for constructing the body of the mobile station. In other embodiments, the stacked elements 1512, 1612, 1712 are electrically connected to one another and also are configured to electrically connect one or more operational elements as described in detail below. The stacked elements 1512, 1612, 1712 may optionally define one or more apertures 1571, 1651, 1761 for receiving one or more operational elements enclosed within the mobile station body. In various embodiments, the plurality of stacked elements may define common apertures or alternatively, one or more of the stacked elements may define uniquely configured apertures. For example, as shown in FIG. 3B, one or more of the stacked elements 1512 may define apertures 1571 for receiving a mobile station engine (not shown). In another embodiment, as shown in FIG. 3C, one or more of the stacked elements 1612 may define apertures 1651 for receiving a display (e.g., LED, LCD, etc.). In still another embodiment, as illustrated in FIG. 3D, one or more of the stacked elements 1712 may define apertures 1761 for receiving and/or operably supporting a keypad (not shown) as known in the art. The above apertures may be integrally formed, punched, stamped, cut (e.g., laser-cut), or produced by other similar processes.

In still other embodiments, the display, keyboard, etc., may be produced integrally within one or more stacked elements. In this regard, such embodiments may include stacked elements having raised portions or protrusions rather than apertures. As will be apparent to one of skill in the art, stacked elements having such protrusions may be disposed adjacent stacked elements having oppositely-shaped apertures such that the overall stack retains a generally uniform shape.

As will be apparent to one of ordinary skill in the art, a mobile station body may be comprised of two or more stacked elements positioned adjacent one another having commonly-aligned apertures for receiving operational elements extending beyond a single stacked element thickness. In alternate embodiments, stacked element layers disposed adjacent one another may have aperture configurations that are not aligned with one another such that operational elements can be secured at different selected positions within the mobile station body. In another embodiment, such as shown in FIG. 3A, the plurality of stacked elements may have a uniform thickness while in other embodiments the thickness may vary between stacked elements. In one embodiment, such as shown in FIG. 3A, the plurality of stacked elements may define a uniform aperture configuration for selected mobile station applications (e.g., mobile phone or lap top computer applications), such that a modular mobile station body design can be achieved. Accordingly, replacement-type and/or supplemental operational elements (e.g., engines, displays, batteries, etc.) can be designed to fit within a predetermined aperture or pocket such that consumers can replace or supplement factory-installed operational elements with newer, faster, or otherwise more desirable elements.

Returning to the embodiment depicted in FIG. 3A, the stacked elements 212, 214, 216, 218, 220 are arranged or "stacked" such that opposed first and second surfaces (e.g., 214A, 214B, 216A, 216B) of each stacked element 212, 214, 216, 218, 220 are placed in face-to-face contact (i.e., 214A is stacked against 216B and so on as shown). In the depicted embodiment, the perimeter edges of the stacked elements are configured to align, thus, defining a uniform lateral edge 205 as shown in FIG. 2. In one embodiment, such uniform lateral edges 205 provide enhanced lateral edge strength for mobile stations having thin, flexible, stacked elements as will be apparent to one of ordinary skill in the art. Further, the sandwich-type structure of the stacked elements provides a superior strength-to-weight ratio (as compared to a single element) and dissipates lateral edge impact energy as will be apparent to one of ordinary skill in the art in view of this disclosure. In other embodiments, such as those employing particularly durable stacked elements, the perimeter edges of adjacent stacked elements may be larger or smaller than those immediately above or below, thus, producing a non-uniform (e.g., tapered, curved, etc.) lateral edge as described further with regard to FIG. 9 below.

In another embodiment, the plurality of stacked elements are self-locating relative to one another. In one embodiment, such self-locating functionality may be provided by defining various alignable ridges, detents, channels or other similar structures into the stacked elements as will be apparent to one of ordinary skill in the art. In other embodiments fasteners or male-female locking mechanisms may be used. In still other embodiments, the stacked elements may be aligned by providing commonly situated apertures configured to receive operational elements extending over multiple stacked element layers, as shown in FIG. 3A. In the depicted embodiment, the plurality of stacked elements are planar rings 212, 214, 216, 218, 220 that fit snugly around the mobile station engine 270 as shown. In one embodiment, the mobile station engine 270 (or other operational element) may have one or more tapered lateral edges (not shown) to facilitate installation and alignment of the stacked elements.

Once stacked, the elements may be bound together in a variety of ways depending upon the application. For example, the stacked elements may be bound rigidly in a mono-block configuration similar to that depicted in FIGS. 2, 5, 9 and 10. Alternatively, in other embodiments, the stacked elements may be allowed to rotate, pivot, twist or translate relative to one another, forming foldable, flip-able, slidable and/or generally deformable mobile station configurations similar to those depicted in FIGS. 12 and 13. Depending upon which of the above configurations is preferred, the stacked elements can be held together via rubber-bands, plastic ties, clips, screw and nut fasteners, pins, hinge-structures, custom retainers, adhesives, and the like.

In addition to the plurality of stacked elements 212, 214, 216, 218, 220, the mobile station 200 depicted in FIG. 3A includes a first cover 230 and a second cover 232. The first cover 230 includes a window 251 for viewing a display 250 and a keymat 261 for engaging a key interface 265. The display 250 and the key interface 265 are supported by circuitry provided within a mobile station engine 270 as shown. In the depicted embodiment, the keymat 261 and the key interface 265 combine to comprise a functioning keypad 260. The mobile station engine 270 provides electronic circuitry for driving the display 250 and keypad 260, in addition to supporting various other operational elements as known to one of ordinary skill in the art. In one embodiment, the mobile station 200 includes fasteners 225 for binding the first and second covers 230, 232 to the mobile station engine 270. For example, such fasteners 225 may simply extend through apertures defined in one or more of the stacked elements to further align and secure the stacked elements. In various embodiments, the fasteners may include rubber-bands, plastic ties, clips, screw and nut fasteners, pins, hinge-structures, custom retainers and the like.

In the depicted embodiment, the stacked elements 212, 214, 216, 218, 220 each define apertures 271, 271', 271", 271''', 271'''' for receiving the mobile station engine 270. In one embodiment, the apertures 271, 271', 271", 271''', 271'''' are configured to fit snugly about the perimeter of the mobile station engine 270. The mobile station engine 270 defines a thickness T and the plurality of stacked elements 212, 214, 216, 218, 220 define individual thicknesses t, t', t", t''', t'''' as shown. In one embodiment, the individual thicknesses t, t', t", t''', t'''' of the stacked elements 212, 214, 216, 218, 220 combine to produce a mobile station body thickness that is greater than or equal to the thickness T of the mobile station engine 270. Accordingly, the mobile station engine 270 can be enclosed, and at least partially protected by, the plurality of stacked elements 212, 214, 216, 218, 220 and the first and second covers 230, 232 as shown. As is apparent to one of ordinary skill in the art, the thickness of adjacent stacked element layers 212, 214, 216, 218, 220 may be uniform as shown, or alternatively, may vary from one layer to the next. Accordingly, multiple stacked element configurations are possible for at least partially enclosing and protecting various operational elements (e.g., mobile station engines, etc.).

By constructing the mobile station body from a plurality of stacked elements in accordance with the present invention, manufacturers offer consumers a unique opportunity for mobile station customization. More particularly, the size, shape, and aesthetic appearance of the mobile station may be tailored to a consumer's tastes. In various embodiments of the present invention, one or more of the stacked elements provided within a factory-equipped mobile station may be replaced or swapped by consumers. These replaceable stacked elements may be formed of any number of materials including paperboard, metal, polymer materials, composite materials, rubber, and other similar materials. Depending upon the materials selected, the stacked elements may be produced by multiple processes known in the art including injection molding, stamping, cutting, laser-cutting, and the like. In various embodiments, consumers replacing original stacked elements configurations may choose to alter the number, thickness and shape of the stacked elements to similarly modify the size, shape, articulation or appearance of the mobile station.

Such modifications may be driven by a variety of factors including personal preference, durability requirements, cost, etc. For example, in one embodiment, a consumer may choose to replace a mobile station body comprised of stacked rigid plastic elements with plurality of stacked elements comprised of thick, over-sized felt; wherein, the felt elements are configured to produce a mobile station body having a natural, supple feel. In still other embodiments, consumers may replace felt or paperboard stacked layers with durable rubber or metal stacked elements designed for use in relatively harsh environments (e.g., construction sites, etc.). In other embodiments, consumers may replace worn or damaged factory-equipped stacked elements with paperboard or other similar low-cost stacked elements. In one embodiment, such paperboard stacked elements may be configured to have a common theme (e.g., sized, shaped, printed or otherwise configured to suggest a baseball, football, movie, playing card or other similar theme) such that the stacked elements may be swapped between consumers, perhaps similar to conventional trading cards.

In addition to altering a mobile station's size, shape, or appearance, consumers are also provided the opportunity to alter or enhance the mobile station's performance. In one embodiment, as referenced above, the plurality of stacked elements may define pockets of a predetermined size for receiving modular operational elements (e.g., mobile station engine, display, etc.). Thus, as more desirable operational elements are produced, consumers are free to replace the factory-equipped modular operational elements with enhanced, more desirable versions. In other embodiments, the factory-equipped stacked elements may define one or more pockets that are too small or too large to properly receive a particular enhanced operational element. In these circumstances, consumers can simply replace one or more of the stacked elements with stacked elements that define a properly sized pocket. In various embodiments, such replacements may require altering the mobile station's overall size and shape while in other embodiments, changes to the mobile station pocket will not require an overall size change.

In view of the above, various manufacturers may choose to provide "kits" comprising enhanced mobile station engines along with stacked elements that define properly sized pockets. In alternate embodiments, kits could be provided without new operational elements that would instead be geared toward making the mobile station body thinner, modifying its shape, color, texture, feel, etc. Essentially, such kits would provide consumers the opportunity to create his or her own unique mobile station from an array of different components. In one embodiment, kits could be provided without stacked elements in order to upgrade only operational elements such as the engine, antenna, display and the like. In still other embodiments, kits could be provided having replacements for worn or damaged factory-equipped components as will be apparent to one of ordinary skill in the art.

In several embodiments of the invention, the plurality of stacked elements provide means for electrical connection between stacked layers and/or operational elements of the mobile station. Such a design may help to achieve the modular functionality described above. In various embodiments, for example, one or more of the stacked elements may include conductive contacts, printed conductive circuits, zebra and other similar connectors, for electrically connecting a first stacked element to an adjacent stacked element and/or for electrically interconnecting the operational elements. In still other embodiments, the stacked elements may comprise alternating layers of thin-conductive rubber and polymer materials for providing a mobile station body that is integrally conductive, environmentally sealed, and impact resistant.

By virtue of the stacked geometry, any one layer may be connected to another neighboring layer through direct (i.e., wired, conductive contact, etc.) and/or wireless electrical connections as known in the art. Non-sequential layers may be connected via intermediate layers, or via a single universal connection hub as illustrated in FIG. 11. The electromechanical composition of each layer, combined with the collective ordering of layers, may be configured to establish a fully functioning wireless system. For example, in one embodiment, the plurality of stacked elements may combine to form a body having an integral mobile station engine. More particularly, the operational elements and related electronic circuitry may be dispersed over various layers of the stack. The layers may be electrically connected (or wirelessly connected) to form a functioning mobile station. In one embodiment, the stack may include an antenna layer, a display layer, a keypad module layer, and a battery or power layer. In such embodiments, adding one or more additional operational element layers may enhance the function of the mobile station. For example, in mobile phone applications, the addition of alternate antenna layers may allow global roaming, or adding larger or thicker battery layers could provide longer operation time between charging. In laptop computer applications, adding additional memory or processor layers may offer improved storage capacity and short process times.

As will be apparent to one of ordinary skill in the art, given the depicted stack direction, traditional external electrical connector ports may be placed adjacent the rear cover of the mobile station rather than being disposed on an edge surface as is currently common. Thus, power may be provided through a fixed charging jack vertically mounted on the back-cover (not shown). In such applications, the charging jack may serve to prop the mobile station up, essentially acting as a temporary back-side stand. In other embodiments, one or more connector ports (power, headphones, etc.) may be hidden between one or more flexibly held stacked elements such that the elements are spread apart for accessing the connector port and returned in face-to-face alignment when the port is not in use.

FIG. 4A illustrates a plurality of stacked elements 312, 313, 314, 315, 316, 317, 318 in accordance with yet another embodiment of the present invention. In the depicted embodiment, the stacked elements 312, 313, 314, 315, 316, 317, 318 are connected to one another, at least partially, adjacent one or more edge portions as shown. The plurality of stacked elements 312, 313, 314, 315, 316, 317, 318 are configured such that they may be folded accordion-style. In one embodiment, such accordion-style folded stacked element configurations are comprised of polymer materials, paperboard, spring metal, and other similar flexible materials. In other embodiments, the folded stacked elements may be comprised of hinged, relatively non-flexible layers comprised of composites, metals or other similar materials. Once folded, the stacked elements 312, 313, 314, 315, 316, 317, 318 combine to produce a body portion 310 shown in FIG. 4B. In various embodiments, the folded body portion 310 is held together by rubber bands, clips, or other mechanical fasteners as known in the art.

In the depicted embodiment, the plurality of stacked elements 315, 316, 317 define one or more apertures 371, 371', 371" for receiving a mobile station engine (not shown). For example, the plurality of stacked elements 312, 313, 314 may also define one or more display windows 351, 351', 351" for receiving a display module (LED, LCD, and the like). As referenced above, the apertures defined in adjacent layers may be aligned to receive operational elements extending over multiple layers or alternatively, may be off-set to distribute operational elements over various layers. In accordion-style and other stacked element configurations, various additional apertures may be provided for receiving other operational elements as will be apparent to one of ordinary skill in the art in view of the above disclosure. In another embodiment, a power port 382 is provided for electrically connecting the mobile station engine (not shown) to a power source such as a battery charger, power cord, AC converter and the like (not shown).

FIG. 5 illustrates a mobile station 400 in accordance with another embodiment of the present invention. The depicted mobile station 400 includes an LCD or other similar display 450 and a keypad 460 as referenced above. Once again, the depicted embodiment also includes a body portion 410 comprised of a plurality of stacked elements 412, 414, 416, 418, 420. First and second covers 430, 432 are provided on opposed sides of the plurality of stacked elements 412, 414, 416, 418, 420 as shown. In contrast to the embodiments depicted in FIGS. 2 and 3, the present embodiment includes stacked elements having at least one non-planar (e.g., curved, tapered, etc.) region 490 as shown. The non-planar region 490 defines a transition between a first plane 491 and a second plane 492. In various embodiments, the non-planar region 490 may provide cosmetic or aesthetic appeal, allow economic packaging (i.e., accommodate use of conventional mobile station packaging) and may provide space within the mobile station for one or more operational elements (e.g., batteries, etc.) as will be apparent to one of ordinary skill in the art. In still other embodiments, the non-planar region 490 provides a means for enhancing the mobile station's grip or use geometry. For example, in mobile phone applications, the body of the phone may include a non-planar or curved region configured to fit comfortably in a user's hand or alternatively, one configured to fit comfortably against a user's head (i.e., ear and mouth) during operation. In another embodiment, as will be apparent to one of ordinary skill in the art, such non-planar regions 490 may result from one or more stacked elements having portions of increased thickness.

FIG. 6 is an exploded view of the mobile station 400 depicted in FIG. 5. As referenced above, the mobile station 400 includes a series of stacked element layers sandwiched between a first cover 430 and a second cover 432. In one embodiment, the first cover 430 includes a cover portion 434, a bezel portion 454, and a keymat portion 461. In one embodiment, the cover portion 434 defines windows for viewing the bezel portion 454 and the keymat portion 461 as shown. In the depicted embodiment, the cover portion 434 is configured as the outermost stacking element and, thus, includes a size, shape, and contour similar to the remaining stacked elements 412, 414, 416, 418, 420. In another embodiment, the cover portion 434 retains the bezel portion 454 and keymat portion 461 within the mobile station body 410. In various embodiments, the first and second covers 430, 432 are comprised of polymer materials, pressed paperboard, metals, rubber, cross-grain wood laminates, compressed felts, dense foams, thermo-formed fabrics (e.g., polycarbonates, etc.) bonded to substrates or other similar materials.

In the depicted embodiment, a display cover 452 is provided for protecting the display 450 from impact or other damage. In one embodiment, the display cover 452 is ultrasonically welded to the back-side of the front cover 430, or alternatively, is permanently mounted to the mobile station engine display 450. In the depicted embodiment, the plurality of stacked elements 412, 414, 416, 418, 420 define apertures 471, 471', 471", 471'", 471"" for receiving the mobile station engine 470. In contrast to the embodiments referenced above, the stacked elements 412, 414, 416, 418, 420 of the depicted embodiment include one or more curved portions 491, 491', 491", 491'", 491"" that track the contour defined between the display 450 and the keypad 460 as shown in FIG. 5. In the embodiment in FIG. 6, the mobile station engine 470 includes an operational unit 474 and a support chassis 472 as shown. In various embodiments, the operational unit 474 may include a key interface 465, a display 450, or other components as known in the art. In other embodiments, the mobile station engine 470 may have integral structural support (not shown). A battery 480 is provided as a power source for the depicted mobile station engine 470.

FIGS. 7A and 7B illustrate a mobile station cover 530 according to one embodiment of the present invention. In various embodiments, the cover 530 may define a display window 551 and keymat 561 as shown. In the depicted embodiment, the cover 530 is comprised, at least partially, of a molded semi-translucent polymer or other similar material.

The cover 530 further includes one or more laser-sensitive pigments. In one embodiment, the cover 530 is produced via injection molding and formed without distinct keys. A variable-power laser is used on a high-power setting for selected cover material, as known in the art, to cut a key pattern 562 through the surface of the cover 530 forming a series of "cantilevered" key-tabs 564. Thus, the key-tabs 564 are not separated from the cover, but are connected along at least a portion of one edge. Once formed, the key-tabs 564 are laser-etched according to one embodiment of the invention. In particular, a variable power laser is directed over the key-tabs 564 on a relatively low-power setting, as known in the art, to etch or mark numbers, letters, icons, characters or other indicia into the key-tabs 564 without completely cutting therethrough. Once key-tabs 564 have been cut and etched, the cover 530 may be added to the remaining components of the mobile station, as the final stacked element, as shown in FIG. 8. In the depicted embodiment, the key-tabs 564 are disposed atop conventional key-domes 563 extending outwardly from the key interface 565 of the mobile station engine 570. When pressed by a user, the cantilevered key-tabs 564 engage the key-domes 563, thus, operating the mobile station as known in the art.

As will be apparent to one of ordinary skill in the art, the laser sensitive pigments formed within the cover 530 become opaque upon exposure to the relatively low-intensity laser light. Accordingly, opaque indicia may be "written" to the key-tabs 534 via the laser, thus, allowing the indicia to stand out against the translucent background. Advantageously, such cutting and etching operations may be conducted quickly and cheaply. In this regard, mobile stations requiring regional language customization can be economically provided via use of simple software or programming controls apparent to one of skill in the art. For example, rather than maintaining an extensive inventory of PDA keypads configured in multiple different languages, a manufacturer can etch the keys with any preferred language and in many cases, tailor the keypad format to a particular order. Further, use of the above referenced translucent polymer materials and contrasting opaque keypad indicia, provides keypads having indicia that are readily legible during daylight hours. In addition, such keypads are likewise viewable during night-time hours as the translucent cover 530 may be back-lit by one or more LEDs or other similar light sources as known in the art.

FIG. 9 illustrates a mobile station 600 having a non-uniform body portion 610 in accordance with one embodiment of the present invention. In the depicted embodiment, the non-uniform body portion 610 is tapered by structuring tapers in one or more of its constituent stacked elements 612, 614, 616, 618, 620. Although the depicted mobile station body 610 tapers from a relatively narrow portion at a first end 601 to a relatively broad portion at a second end 602, the present invention is not limited to such a configuration. In alternate embodiments, the taper may be oppositely configured or alternatively, the mobile station 600 may include two tapers extending outwardly from a median region (not shown). In still other embodiments, the non-uniform body portion 610 need not be tapered. Rather, such embodiments may include other configurations of non-flush body portion alignment (e.g., non-flush stacked element perimeter alignment, non-flush stacked element surface alignment, etc.) that may add to the mobile stations functionality or desirability. For example, various embodiments may be configured to have mis-aligned stacked element perimeters for enhancing grip geometry while other embodiments may include stacked elements configured to define laterally disposed ports or recesses between one or more stacked elements for receiving memory cartridges, power cords, and other connectors.

FIG. 10 illustrates a mobile station 700 having a hanger portion 708 in accordance with one embodiment of the present invention. In the depicted embodiment, the hanger portion 708 is produced by the unique shape of one or more of the plurality of stacked elements 712, 714, 716, 718, 720, which are commonly configured to define an aperture 707 as shown. Accordingly, the mobile station 700 is configured to be readily graspable or possibly hang from a user's belt. In alternate embodiments, the plurality of stacked elements may be configured to define a hook, handle, or other functional shape as will be apparent to one of skill in the art in view of the above disclosure.

In other embodiments of the present invention, the plurality of stacked elements may be configured along multiple different planes as shown in FIGS. 11A-11C. For example, as illustrated by the embodiment depicted in FIG. 11A, the plurality of stacked elements 812, 814, 816, 818 may be aligned vertically such that their perimeter edge portions combine to define the width W of the mobile station body 810 as shown. In alternate embodiments, the stacked elements 912, 914, 916, 918 may be aligned vertically such that their perimeter edges combine to define the front or rear surfaces of the mobile station 900 as shown in FIG. 11B. Finally, in still another embodiment, the stacked elements 1012, 1014, 1016, 1018 may be aligned horizontally such that their perimeter edges combine to define the front or rear surface of the mobile station 1000 as shown in FIG. 11C.

In other embodiments of the present invention, the plurality of stacked elements may be configured in one or more non-linear orientations as shown in FIGS. 11D-11F. For example, as illustrated by the embodiment depicted in FIG. 11D, the plurality of stacked elements 1312, 1314, 1316, 1318, 1322 may be aligned diagonally such that their perimeter edge portions combine to define the thickness of the mobile station body 1310. In alternate embodiments, the diagonally aligned stacked elements 1312, 1314, 1316, 1318, 1322 may define the front or rear surfaces of the mobile station as will be apparent to one of ordinary skill in the art. In other embodiments, the stacked elements 1412, 1414, 1416, may be curved as shown in FIG. 11E. Finally, in still another embodiment, the stacked elements 1512, 1514 may be aligned three-dimensionally such that a portion 1511 of a first element 1512 extends at least partially into an aperture 1515 defined in a second element 1514 as shown in FIG. 11F.

FIGS. 12A-12B illustrate a foldable mobile station 1100 in accordance with another embodiment of the present invention. Foldable mobile stations 1100 of the type depicted may offer greater protection for the various internal operational elements, than mono-block style mobile stations shown in FIG. 2. A foldable mobile station is one that may be, generally speaking, folded in half. For the purposes of this application, the term "folded in half" is used in a general sense, that is, the two "halves" are not necessarily equal in size. There may even be more than two "halves" although such a design is not typical. The foldable mobile station 1100 may be "opened" or "closed" by a user to either reveal, or secure, the display 1150, keypad 1160 or other operational elements as shown.

In various embodiments, the body 1110 of the foldable mobile station is comprised of a plurality of stacked elements 1112, 1114, 1116, 1118, 1120 that are sandwiched between first and second protective covers 1130, 1132. In the depicted embodiment, the mobile station is "foldable" due to a centrally disposed foldable region 1105. The foldable region 1105 is comprised of flexible first and second covers 1130, 1132 and flexible stacked elements 1112, 1114, 1116, 1118, 1120 configured to prevent kinking upon folding. In one embodiment, the first and second covers 1130, 1132 and stacked elements 1112, 1114, 1116, 1118, 1120 are flexible only in the foldable region 1105, while in other embodiments, the covers 1130, 1132 and stacked elements 1112, 1114, 1116, 1118, 1120 are flexible throughout.

As will be apparent to one of ordinary skill in the art, during folding, the stacked elements adjacent the second cover 1132 are folded over a greater radius than the stacked elements adjacent the first cover 1130. Accordingly, in embodiments having stacked elements comprised of non-stretchable materials, it is desirable for at least some the stacked elements to be slideable relatively to adjacent stacked elements, thus, reducing the potential for gaps or kinking. In the depicted embodiment, the plurality of stacked elements 1112, 1114, 1116, 1118, 1120 are bound together securely adjacent a first end 1101 and are slideable relative to one another adjacent a second end 1102. The stacked elements become gradually longer as they progress from the first cover 1130 toward the second cover 1132. As a result, the foldable mobile station may be configured to achieve a substantially planar second end 1102 in the folded position as shown in FIG. 12B. In other embodiments, multiple other folded end configurations may be provided as apparent to one of skill in the art. When opened, the stacked elements unfurl to their original alignment as shown in FIG. 12A.

The sliding action provided between stacking element layers may require certain design considerations depending upon the application. For example, in one embodiment, operational elements having a thickness that extends beyond one stacking element layer (e.g., a display extending between apertures in two adjacent layers) may be provided adjacent the fixed (rather than sliding) end such that a proper sliding action is not inhibited. In other embodiments, the apertures receiving the operational elements may be slotted to accommodate sliding between adjacent operational elements. In still other embodiments, lubricants may be provided between stacked elements to reduce the deleterious effects of friction. In other embodiments, channels may be defined between adjacent stacked elements such that the elements slide in a predetermined fashion relative to one another. Finally, in still other embodiments, locking devices may be provided to fix the layers relative to one another and, thus, maintain the mobile station in a folded position. In one embodiment, for example, an aperture may be defined in the surface of one of the stacked elements such that a prong provided on the opposed surface of an adjacent stacked element can be deposited into the aperture upon reaching a desired bend radius. Accordingly, the mobile station may be fixed in an open, folded, or partially folded position.

FIG. 13 depicts a mobile station 1200 in accordance with yet another embodiment of the present invention. The mobile station 1200 is comprised of a plurality of stacked elements 1212, 1214, 1216, secured together by a connector hub 1275. In various embodiments, one or more operational elements are disposed adjacent one or more of the stacked elements 1212, 1214, 1216. For example, in the depicted embodiment, a display 1250 is provided adjacent a first layer 1212 and an antenna is provided adjacent a second layer 1214. Additional layers may include other operational elements such as keypads, batteries, processors, and the like. In one embodiment, the connector hub 1275 includes one or more circuits or conductive areas for electrically connecting one or more of the stacked elements. The connector hub 1275 may include one or more buttons, keys, switches, etc. (not shown), which allow a user to operate the mobile station. In various embodiments, the stacked elements may include a flexible portion such that the elements may be opened (i.e., spread apart) or closed. In other embodiments, the hub may bind the stacked elements via a pin such that the stacked elements may be "opened" by pivoting the stacked elements relative to each other.

In another embodiment, one or more of the stacked elements may be translatable through the hub and then folded over to device a cover element 1216' as shown. In other embodiments, the translatable element is not folded over and instead serves to elongate the mobile station as it is drawn through the hub. For example, in mobile phone applications the translatable element could include a speaker while a non-translatable element includes a microphone. When extended, the mobile station bridges the gap between a user's ear and mouth while retracting (i.e., sliding the translating member back through the hub) to a compact size when not in use. In various embodiments, as referenced above, the operational elements configured adjacent the stacked elements may be wirelessly connected as known in the art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mobile station, comprising:
a body defining a first end, a second end, and a foldable region disposed therebetween, the body comprising a plurality of stacked elements, wherein the plurality of stacked elements define opposed surfaces and a perimeter edge extending thereabout, wherein the opposed surfaces are configured in a facing relationship, wherein at least a portion of the opposed surfaces of at least two of the plurality of stacked elements are structured to slidably translate relative to one another along a slide axis, and wherein the plurality of stacked elements are at least partially flexible within the foldable region such that the body is moveable between open and folded positions.

2. The mobile station of claim 1, wherein:
at least one of the plurality of stacked elements defines an aperture for receiving an operational element.

3. The mobile station of claim 1, wherein:
at least one of the plurality of stacked elements is configured adjacent one or more operational elements.

4. The mobile station of claim 1, wherein:
the plurality of stacked elements define respective non-aligned apertures configured to receive and distribute operational elements over two or more stacked element layers.

5. The mobile station of claim 1, wherein:
the plurality of stacked elements are configured to be removable and replaceable.

6. The mobile station of claim 1, wherein:
the plurality of stacked elements are ring-shaped.

7. The mobile station of claim 6, wherein:
the plurality of ring-shaped stacked elements are configured to surround an operational element.

8. The mobile station of claim 6, wherein:
the plurality of ring-shaped stacked elements combine to define a ring-shaped body.

9. The mobile station of claim 1, further comprising:
first and second covers removably attached to first and second sides of the mobile station body.

10. The mobile station of claim 9, wherein:
the first and second covers include fasteners having a locked and unlocked state, wherein the plurality of stacked elements are held in place in the locked state and the plurality of stacked elements are removable in the unlocked state.

11. The mobile station of claim 1, wherein:
the perimeter edges of the plurality of stacked elements are aligned to define a substantially uniform lateral edge.

12. The mobile station of claim 1, wherein:
the perimeter edges of the plurality of stacked elements are aligned to define a tapered lateral edge.

13. The mobile station of claim 1, wherein:
the perimeter edges of the plurality of stacked elements are aligned to define a curved lateral edge.

14. The mobile station of claim 1, wherein:
the opposed surfaces of the plurality of stacked elements are substantially planar.

15. The mobile station of claim 1, wherein:
at least one of the plurality of stacked elements is tapered between a first end and a second end.

16. The mobile station of claim 1, wherein:
at least one of the plurality of stacked elements extends outwardly beyond the perimeter of adjacent stacked elements to define a hanger for suspending the mobile station.

17. The mobile station of claim 1, further comprising:
conductive regions provided adjacent the opposed surfaces of at least two of the plurality of stacked elements, wherein the conductive regions are configured for electrically connecting the at least two stacked elements.

18. A method of manufacturing a mobile station comprising the steps of:
stacking a plurality of replaceable stacked elements to form a body, the body defining a first end, a second end, and a foldable region disposed therebetween, the plurality of replaceable stacked elements each including opposed surfaces and a perimeter edge extending thereabout, wherein the opposed surfaces of the plurality of stacked elements are configured in a facing relationship, wherein at least a portion of the opposed surfaces of at least two of the plurality of stacked elements are structured to slidably translate relative to one another along a slide axis, and wherein the plurality of stacked elements are at least partially flexible within the foldable region such that the body is moveable between open and folded positions; and
removably coupling at least a first cover to the body.

19. The method of manufacturing the mobile station of claim 18, further comprising the step of:
providing at least one replaceable stacked element defining an aperture for receiving an operational element.

20. The method of manufacturing the mobile station of claim 18, further comprising the step of:
attaching one or more operational elements to at least one of the plurality of replaceable stacked elements.

21. The method of manufacturing the mobile station of claim 18, further comprising the step of:
providing non-aligned apertures configured in two or more of the plurality of replaceable stacked elements; and
inserting different operational elements in respective non-aligned apertures defined by the two or more stacked element layers.

22. The method of manufacturing the mobile station of claim 18, wherein:
the plurality of replaceable stacked elements are ring-shaped.

23. The method of manufacturing the mobile station of claim 22, further comprising:
inserting an operational element within the plurality of ring-shaped stacked elements.

24. The method of manufacturing the mobile station of claim 22, further comprising the step of:
constructing a ring-shaped mobile station body from the plurality of ring-shaped stacked elements.

25. The method of manufacturing the mobile station of claim 18, further comprising the step of:
removably attaching first and second covers to first and second sides of the mobile station body.

26. The method of manufacturing the mobile station of claim 18, further comprising the step of:
securing first and second covers to the first and second sides of the mobile station body via fasteners having a locked and unlocked state, wherein the plurality of replaceable stacked elements are fixed together in the locked state and the plurality of stacked elements are removable in the unlocked state.

27. The method of manufacturing the mobile station of claim 18, further comprising the step of:
electrically connecting at least two of the plurality of replaceable stacked elements.

28. The method of manufacturing the mobile station of claim 27, further comprising the step of:
providing at least two operational elements in electrical communication via the electrical connection of the at least two replaceable stacked elements.

* * * * *